United States Patent
Barkhoudarian

(10) Patent No.: US 7,318,007 B2
(45) Date of Patent: Jan. 8, 2008

(54) REAL TIME GEAR BOX HEALTH MANAGEMENT SYSTEM AND METHOD OF USING THE SAME

(75) Inventor: Sarkis Barkhoudarian, West Hills, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/750,512

(22) Filed: Dec. 31, 2003

(65) Prior Publication Data

US 2005/0149290 A1 Jul. 7, 2005

(51) Int. Cl.
*G06F 11/30* (2006.01)

(52) U.S. Cl. ................................. 702/184

(58) Field of Classification Search ............ 702/32, 702/34, 183–184; 700/99, 175, 176; 701/45; 703/7
See application file for complete search history.

(56) References Cited

U.S. PATENT DOCUMENTS

| | | | |
|---|---|---|---|
| 6,053,047 A * | 4/2000 | Dister et al. ............ 73/593 |
| 6,467,752 B2 * | 10/2002 | Woods ............... 251/148 |
| 6,526,356 B1 | 2/2003 | DiMaggio et al. | |
| 6,567,752 B2 * | 5/2003 | Cusumano et al. ...... 702/34 |
| 6,847,854 B2 * | 1/2005 | Discenzo ............ 700/99 |
| 6,859,739 B2 * | 2/2005 | Wegerich et al. ...... 702/32 |
| 2004/0039509 A1 * | 2/2004 | Breed ............... 701/45 |
| 2004/0199368 A1 * | 10/2004 | Bechhoefer ............ 703/7 |
| 2005/0246150 A1 * | 11/2005 | Shiromaru et al. ...... 703/7 |

* cited by examiner

*Primary Examiner*—John Barlow
*Assistant Examiner*—Aditya Bhat
(74) *Attorney, Agent, or Firm*—Kinney & Lange, P.A.

(57) ABSTRACT

A system is provided for monitoring rotating machinery having a shaft and circumferentially disposed extensions rotatable with the shaft and spaced apart from one another. The system includes a plurality of proximeters positioned proximate to the rotating machinery and operable to measure and transmit resonant vibration frequency and amplitude data derived from a transit time between the individual rotating extensions, along with signal amplitude data, and a processor electrically coupled to receive the data and configured to correlate the data and thereby produce an assessment of operational health for the machinery. A method is also provided for monitoring rotating machinery, using the system of the invention.

66 Claims, 8 Drawing Sheets

REAL TIME GEAR BOX HEALTH MANAGEMENT SYSTEM AND METHOD OF USING THE SAME

TECHNICAL FIELD

The present invention generally relates to a method for tracking the progression of machinery wear, and more particularly relates to real time monitoring degradation and wear on gears and other rotating machinery.

BACKGROUND

Machinery condition monitoring is commonly performed in the machining industry as an effort to wholly utilize the useful life of machinery and the mechanical devices associated therewith. Failing rotating machinery in a complex machine such as a vehicle transmission can cause damage to other machine components, and sometimes necessitate replacement of the entire machine instead of the failed rotating machinery. Faulty rotating machinery should consequently be discovered and replaced before it fails. In some industries, gearboxes are routinely and periodically inspected, and gears or blades are often replaced at set periods of time even if a pending failure is not predicted. Inspections are costly, requiring many work hours as well as undesirable machine downtime and disassembly. Further, prematurely replacing gearboxes or individual gearbox components unnecessarily reduces their useful life.

In view of the needs for extending the useful life of rotating machinery and removing the risk of failure during use, technology has been developed for monitoring machinery while in use. For instance, there is currently a trend toward reusable launch vehicles that will require turbomachinery to operate for extended periods of time and on multiple missions.

Accelerometers are conventionally used to monitor rotating machinery and gears, and to determine operating performance and condition. Particular vibration signatures are related to specific types of component defects. For example, discrete gear tooth defects are often characterized in the frequency domain by the appearance of spectral components at higher order harmonics of the speed of the shaft upon which the faulty gear is located. The simplest fault detection techniques use a change in statistical properties of the vibration signal as a measure of engine health. However, the high operating speeds for engine turbopumps often render the data acquisition instrumentation incapable of measuring the vibration responses up to the gear mesh frequency.

Conventional methods for monitoring rotating machinery are also inadequate for continuously measuring fatigue level and gear chattering in real time. Further, such methods are inadequate for directly measuring gear tooth stress as it meshes with another gear. Accelerometers unfortunately respond to the combined resonances of all the components in the gearbox, including other gears, the housing, the gear shafts, bearings, and any other moving components. The inability of accelerometers to isolate the gear tooth resonances complicates fault detection.

Accordingly, it is desirable to provide a real time machinery health management system that directly monitors gear chattering and individual gear tooth deflection resonance amplitude, frequency, and duration. In addition, it is desirable to provide such a system that determines the fatigue level of each gear tooth and predicts the imminence of a failure in real time. It is also desirable for the system to be non-intrusive so the system remains intact when machinery parts are being replaced, lubricated, and cleaned, etc. Furthermore, other desirable features and characteristics of the present invention will become apparent from the subsequent detailed description and the appended claims, taken in conjunction with the accompanying drawings and the foregoing technical field and background.

BRIEF SUMMARY

A system is provided for monitoring rotating machinery having circumferentially disposed rotating extensions spaced apart from one another. The system comprises a plurality of proximeters positioned proximate to the rotating machinery and operable to measure and transmit resonant vibration frequency and amplitude data derived from a transit time between the individual rotating extensions, along with signal amplitude data, and a processor electrically coupled to receive the data and configured to correlate the data and thereby produce an assessment of operational health for the machinery.

A method is also provided for monitoring rotating machinery having circumferentially disposed rotating extensions spaced apart from one another. The method comprises the steps of positioning a plurality of proximeters proximate to the rotating machinery, the proximeters being operable to measure and transmit resonant vibration frequency and amplitude data derived from a transit time between the individual rotating extensions, along with signal amplitude data; receiving and correlating the data using a processor that is electrically coupled to the plurality of proximeters; and producing an assessment of operational health for the machinery based on the measurements using the processor.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
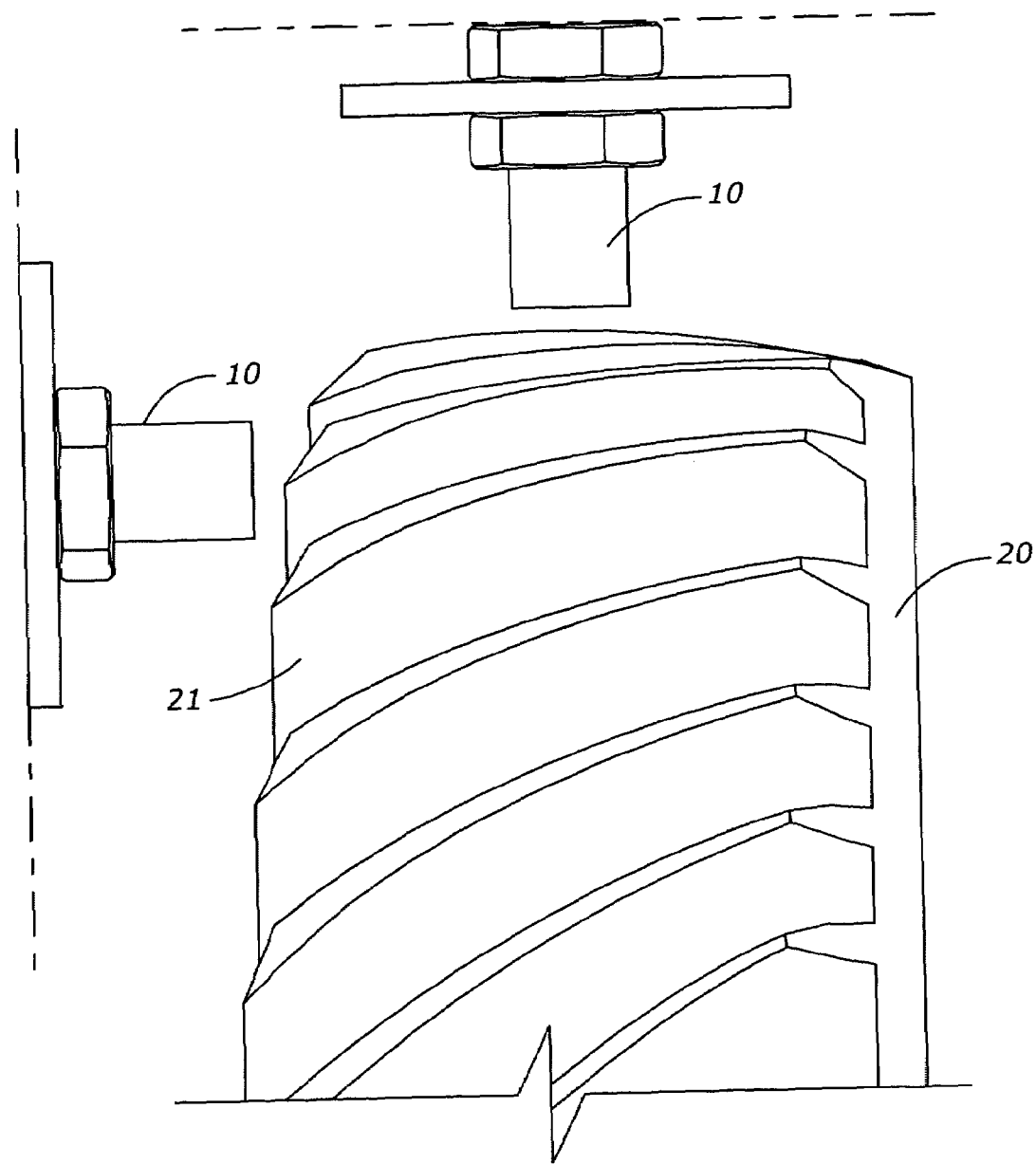
FIG. 1 is a perspective view of a gear with proximeters disposed radially and axially about a gear tooth to simulate an intrusive proximeter arrangement according to the present invention.

The present invention includes the use of sensors such as electromagnetic, optical, fiber optical, and capacitive proximeters, hereinafter referred to simply as "proximeters," to measure the resonant vibration frequency and bending amplitude of rotating machinery such as blades or gear teeth in real time as they, and associated rotating machinery, are loaded with use-related stresses. For instance, the proximeters may be used to measure the stresses on individual gear teeth as they mesh with other gears, and as other teeth on the same gear mesh with other gears. FIG. 1 illustrates proximeters 10 radially and axially oriented with respect to a rotating gear 21, although either orientation or other orientations may be suitable for effective use of the proximeters. In FIG. 1, the depicted machinery is a forward rotor transmission spiral bevel pinion, although the principles of the invention apply to any type of machinery subjected to stress, and particularly rotating machinery. The rotating machinery that is monitored according with the principles of the present invention will be hereinafter simply referred to as a gear 20. In addition, multiple proximeters 10 can be located axially near the meshing teeth to directly measure transient deflections due to chattering, and the corresponding loads can be derived from the measurements.

Measurements from the proximeters 10 provide the resonance amplitude, frequency, and duration for individual gear teeth or turbine blades 21. The use of multiple proximeters enables mapping of the entire resonance period for the gear teeth instead of duplicatively mapping a single or limited set of data points within the resonance period. In an exemplary embodiment of the invention, the proximeters are configured and spaced about the gear to measure at odd harmonics of the resonance frequency quarter wavelength for each gear tooth. There are preferably at least three proximeters per gear to map the entire resonance period.

Figure 2A:
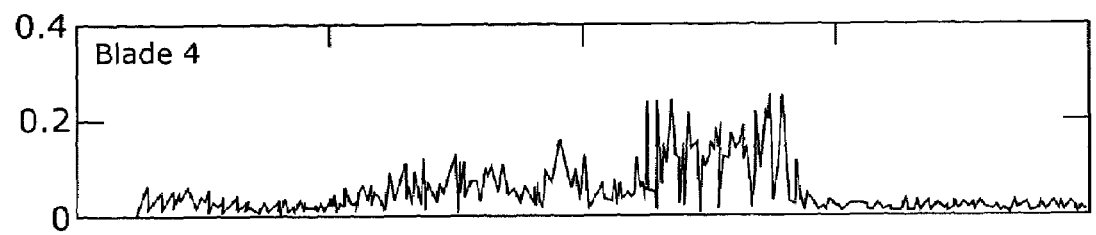
FIG. 2A is a graph of root strain values that were obtained using a circumferentially disposed proximeters to measure transient deflections for rotating blades according to the present invention.
Figure 2B:
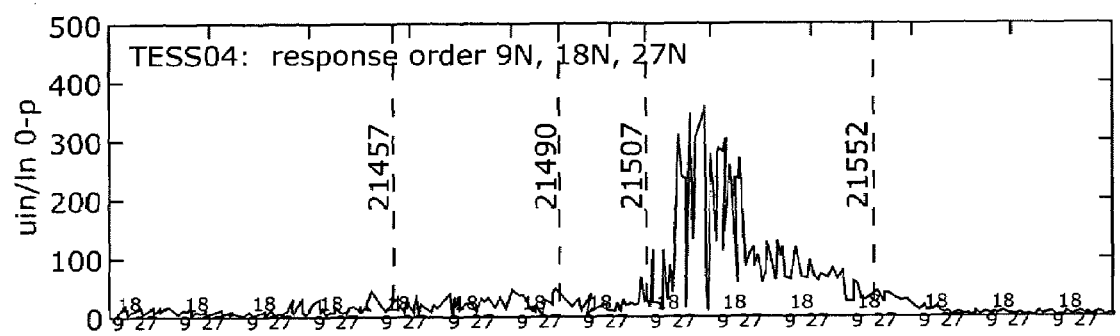
FIG. 2B is a graph of root strain values that were obtained using a slipring strain gauge to measure transient deflections for rotating blades for comparison with the values measured in FIG. 2A.

The resonance data can be totaled and graphed to provide an accumulated fatigue level for each tooth 21 in real time. Statistical models based on previously accumulated resonance data establish maximum values for acceptable fatigue level. By comparing the real time fatigue level data with the maximum acceptable fatigue level using appropriate algorithms, the remaining life of the gear tooth 21 can be predicted. Further, the algorithms can be derived from cross correlation of data from two or more radial or axial proximeters that are located circumferentially proximate to, and circumferentially far away from, the gear meshing area. The data can also be correlated with data from multiple gears. FIG. 2A is a graph of root strain values that were obtained using circumferentially disposed proximeters (0.25 mil) to measure transient deflections for a rotating turbine blade. The results (about 330 microstrain) were obtained by measuring resonance while the blades rotated at about 25,000 rpm. FIG. 2B is a graph of root strain values for the same blade, and the measurements in FIG. 2B were simultaneously obtained with the measurements from FIG. 2A, although in this case using a strain gauge connected to the data acquisition system using slip rings. The results (about 350 microstrain) from FIG. 2B are depicted directly below those of FIG. 2A with the response orders in alignment for comparative purposes, and reveal that the proximeters measure many root strain values at frequencies corresponding to the same root strain value frequencies measured using the strain gauge without contact.

Figure 3A:
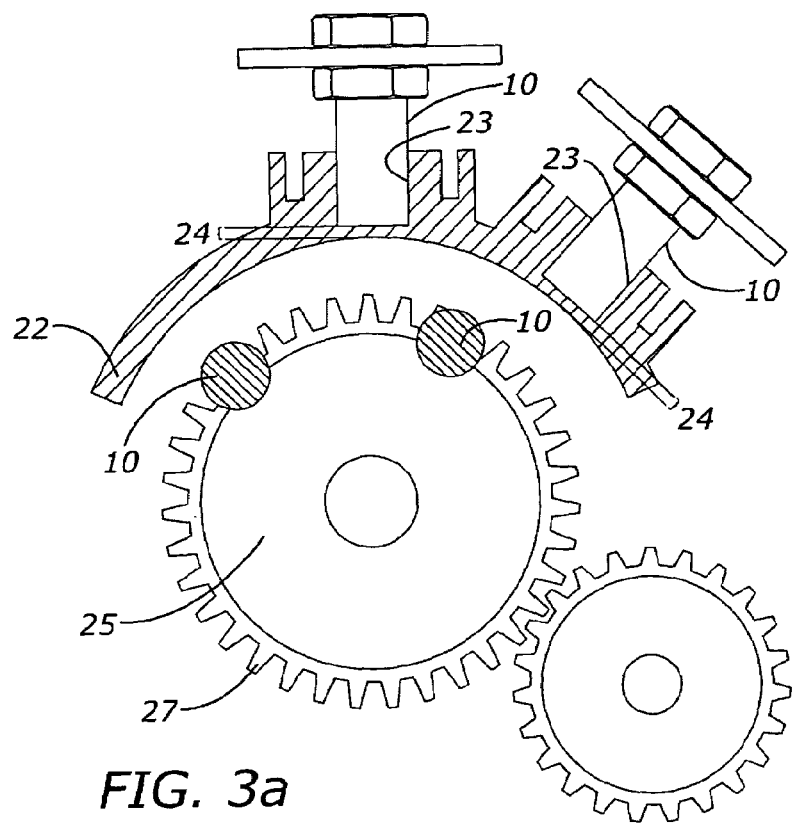
FIG. 3A is a cross sectional view of a gearbox with embossed blind holes formed in a gearbox housing to secure proximeters for nonintrusive measurements according to the present invention.

The measurements obtained using proximeters according to the principles of the present invention are advantageous, in comparison with a strain gauge measurement requiring slip rings, because they are preformed without requiring a hole to penetrate the gearbox housing. For some types of proximeters such as optical and fiber optical proximeters it is necessary for an intrusive assembly including a through hole in the gearbox housing that extends to the housing interior and allows the proximeters to be directly adjacent to the gear. An exemplary embodiment utilizes an electromagnetic proximeter in a nonintrusive assembly, as depicted in FIG. 3A. A gearbox housing 22 has blind holes 23 embossed therein to house proximeters 10. The blind holes 23 do not quite penetrate through the entire gear box housing 22. Although not necessarily shown to scale in FIG. 3, the housing material layer 24 at the bottom of each blind hole 23 is sufficiently thin to allow electromagnetic energy generated from the rotating gear 25 to penetrate the layer 24 and generate an electrical signal in the proximeter coil. The layer 24 should also be thick enough to prevent any fluid leakage or contamination and to withstand the internal pressure that is inherently part of the gear environment. The optimizations for the proximeter diameter and the thickness for the layer 24 are functions of such factors as the gear and housing material permeability, resistivity, gear rotation speed, number of teeth per gear, the gap between the proximeter and a gear tooth 27, and the internal pressure. Thus, the proximeters should be fabricated with each of these parameters in mind, as well as the number of proximeters 10 to be used, and the proximeter coil inductance, parasitic capacitance, magnetic properties, strength, and orientation with respect to the gear.

Figure 3B:
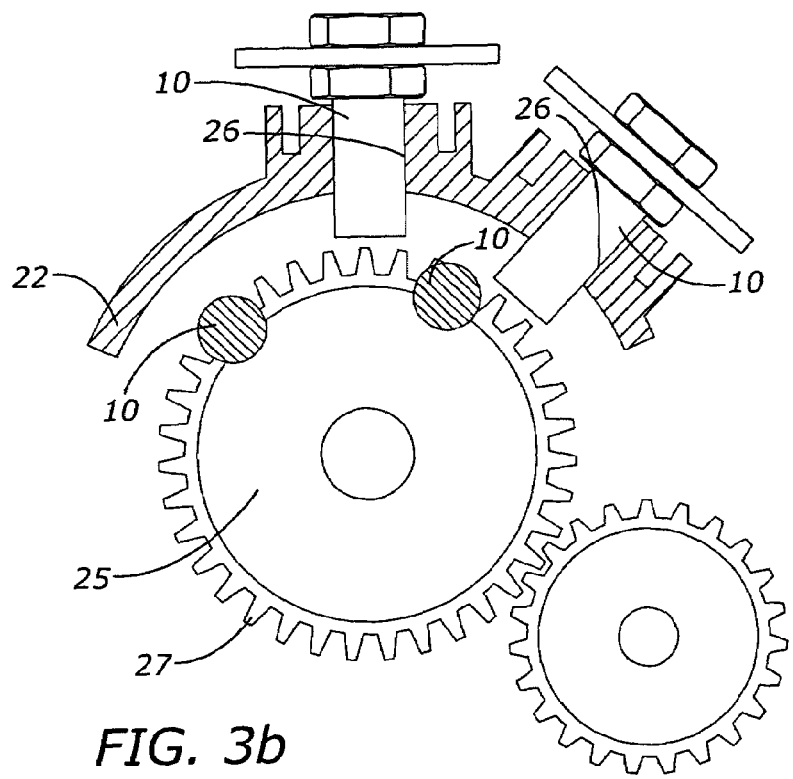
FIG. 3B is a cross sectional view of a gearbox with through holes formed in a gearbox housing to secure proximeters for intrusive measurements according to the present invention.

FIG. 3B depicts an exemplary embodiment utilizing an electromagnetic proximeter, or other type of proximeter, in a nonintrusive assembly. The gearbox housing 22 has through holes 26 that house proximeters 10 that penetrate the gear box housing 22 and are consequently exposed to the gear 25.

Figure 4:
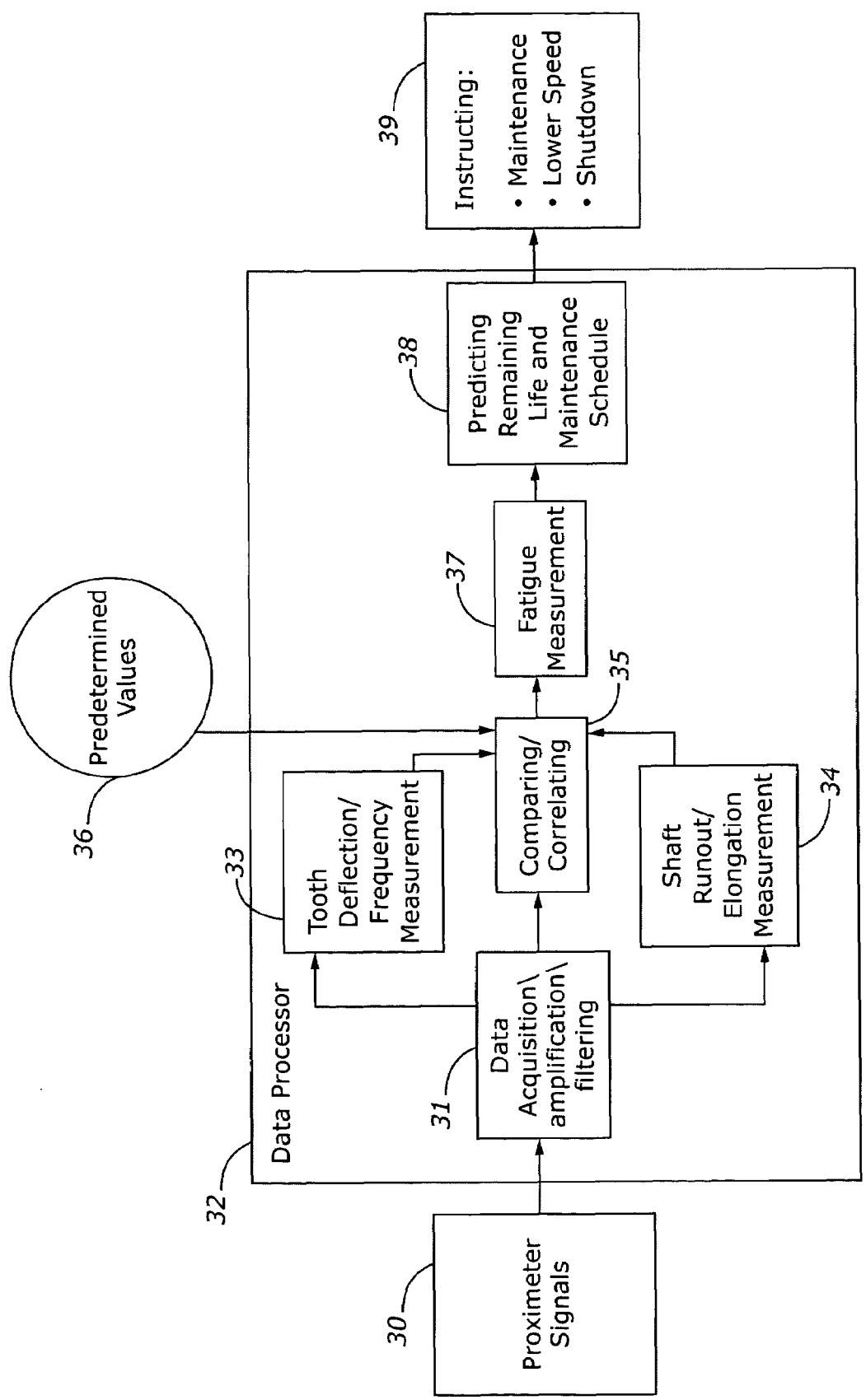
FIG. 4 is a diagram of a processing method that is carried out according to the present invention, including fault detection/isolation/prediction algorithms that are processed and carried out using a comparing and correlation program and associated hardware.

FIG. 4 is a diagram of a processing method that is carried out according to the present invention, including fault detection/isolation/prediction algorithms that are processed and carried out using a comparing and correlation program and associated hardware, hereinafter collectively referred to as a comparator/correlator. The method is described in relation to gear tooth monitoring, although the method can be applied to other types of rotating machinery.

First, electrical signals 30 are generated in multiple proximeters that are radially and/or axially oriented with respect to at least one of a plurality of meshing gears, as illustrated in FIGS. 3A and 3B. The proximeters are disposed sufficiently proximate to the selected rotating gear to generate accurate signals representing resonant vibration frequencies and/or the bending amplitude of the individual gear teeth. The resonant vibration frequency and amplitude are derived by measuring the transit times between a given set of teeth as they rotate. However, multiple revolutions are often necessary to create an accurate resonant circumferential oscillation profile since for each revolution a gear tooth likely has a very slightly different transit time due to resonance.

In contrast to the circumferential measurements made in the time domain to determine resonant vibration frequency and bending amplitude, a measurement for the distance between the gear and the housing is a function of signal strength. More particularly, the change in signal amplitude, typically measured in millivolts, corresponds to the radial gap between a gear tooth and the housing. Data from radial dimension measurements are also used to measure the shaft runout. Also, vibration signal amplitude measurements provided from axially disposed proximeters determine axial back-and-forth gear movements.

The electrical signals 30 are sent to a data processor 32 that is in electrical communication with the proximeters, and includes data processing, measurement, comparing, and correlating circuitry. In step 31, electronic circuitry that is in electrical communication with the proximeters acquires the data from the electrical signals. The data are also amplified and filtered in step 31 using data processing circuitry. Using the processed data, deflection and corresponding frequency measurements are carried out in step 33. Elongation measurements and shaft runout measurements which are derived from radial dimension data measurements are carried out in step 34. The measurements are inputted into a comparator/correlator in step 35 along with predetermined maximum values for such characteristics as bending, elongation, and resonance frequency which are inputted into the comparator/correlator which normalizes the measurements in step 36. Fatigue measurements are carried out in step 37, and predictions for factors such as the gear maintenance schedule and the remaining useful gear life are carried out in step 38. Instructions are then outputted in step 39 to the machinery user or monitor. The output can include maintenance instructions, instructions to change the machinery speed, or shutdown instructions.

In an exemplary embodiment of the invention, the algorithms for normalizing the measurements compensate for gear, axle, and tooth manufacturing tolerances and wear, thereby further improving the signal to noise ratio. Other measurements and algorithms can be used to compensate for the load-bearing shaft fluctuations in a circumferential and/or axial direction due to axle bearing variations and wear. For example, the back-and-forth gear movement, chattering, amplitude, and frequency can be measured using axial proximeters. In addition, the severity of gear chattering can be correlated with the amount of lubricating film between the meshing gear teeth using an appropriate algorithm. The normalized measurements are then compared with the allowed maximum values.

In step 38, instructions are generated if a determination based on the data comparisons is made that instructions are necessary. For instance, if a fault is detected or predicted with the comparator/correlator based on an intermediate level of deflection and/or change in resonant frequency, the instructions may provided by generating a textual, audio or video alerting signal, for example, that may also include the necessary maintenance procedures. At a higher level of deflection or change in resonance frequency, the alerting signal and instructions may be sent in real time to a pilot or other controller for manually or automatically lowering the load on the pertinent gears, or to stop usage entirely. At very high levels of deflection or change in resonance frequency, the machinery may be automatically halt action of some of the gears or associated machinery, or shut the rotating machinery down altogether, in order to avoid further damage to the pertinent gears or associated machinery. In addition to the above instructions, the fatigue level can be used to predict the remaining machinery work life and to determine and provide other instructions pertaining to operating and maintaining the machinery, and emergency mitigation.

The data acquisition and processing steps, along with the measuring steps described above, were tested in the following example in which electromagnetic proximeters were utilized to measure gear tooth vibration modes. The proximeters exhibited the ability to gather vibration data isolated to a single gear tooth. The example also revealed the ability for the data to be gathered using proximeters that are mounted on a stationary structure, such as a gear housing, instead of a moving gear.

EXAMPLE

Testing in this example involved a stationary, free-standing helicopter transmission drive gear. Proximeters and other measurement instrumentation were located around the gear teeth to measure and track changes in structural dynamic characteristics of the transmission drive gear.

The tests were conducted by striking a tooth with an electromagnetic hammer and measuring the response of the proximeters near the stricken tooth. Using a clock analogy for nomenclature purposes, a gear tooth at the 12:00 position was struck, and proximeters were disposed at the 12:00, 3:00, 6:00, and 9:00 teeth. The procedure and measurements were performed on unmodified gears, gears with a small tooth crack, and gears with a large tooth crack. The gear tooth cracks, or flaws, were generated by electro-discharge machining (EDM) slots at the gear tooth root to produce changes in the gear tooth dynamic responses, simulating a crack growing in the gear rim.

Radially and axially oriented proximeters were also compared with other types of test instrumentation to demonstrate proximeter measurement reliability and accuracy when measuring the simulated flaws at different locations. The other measurement devices consisted of four accelerometers, six strain gages, and a non-contact laser vibration pattern imaging (VPI) system. For each test case, data from these three "standard" instrumentation types were compared with data from the proximeters to ensure that the peaks being analyzed were hardware related, and not induced due to noise or instrumentation. Frequency response information for the measurement systems follows.

The accelerometers had a frequency response=5 Hz to 15 kHz, and sensitivity typically=0.6 pC/g. While accelerometer frequency response is given as 15 kHz maximum, data from the instrument can still be obtained and evaluated on a qualitative basis using peak frequency identification. However, due to the effects of the accelerometer piezoelectric crystal resonance, amplitudes above 15 kHz are not considered calibrated or validated. The accelerometers were installed directly on the gear tooth features for expedience and optimum performance during the hammer tests, although it is not typical for accelerometers to be directly attached to working surfaces in a rotating system.

The laser VPI was an Ometron™ VPI 9000 having a frequency response=40 Hz to 60 kHz, and sensitivity=2.54 mv/inch/sec. The laser VPI was positioned to measure the bottom of the leading edge of the 12:00 tooth. The system was set to measure in the medium range at a distance of 33 inches from the part, which experience has shown to be an optimum range for these conditions. The laser was maintained at this measurement location for all testing.

The DC strain gages had a sensitivity of up to 100 kHz, wherein the upper frequency bound is a function of the bridge completion amplifiers, not the gages themselves. The sensitivity for the strain gages=50 µe/V.

A Hewlett Packard™ modal data acquisition system (DC, 60 kHz, 8 channels+source excitation) was incorporated in electrical communication with each of the measurement devices. The test specimen was a forward rotor transmission spiral bevel pinion.

Figure 10:
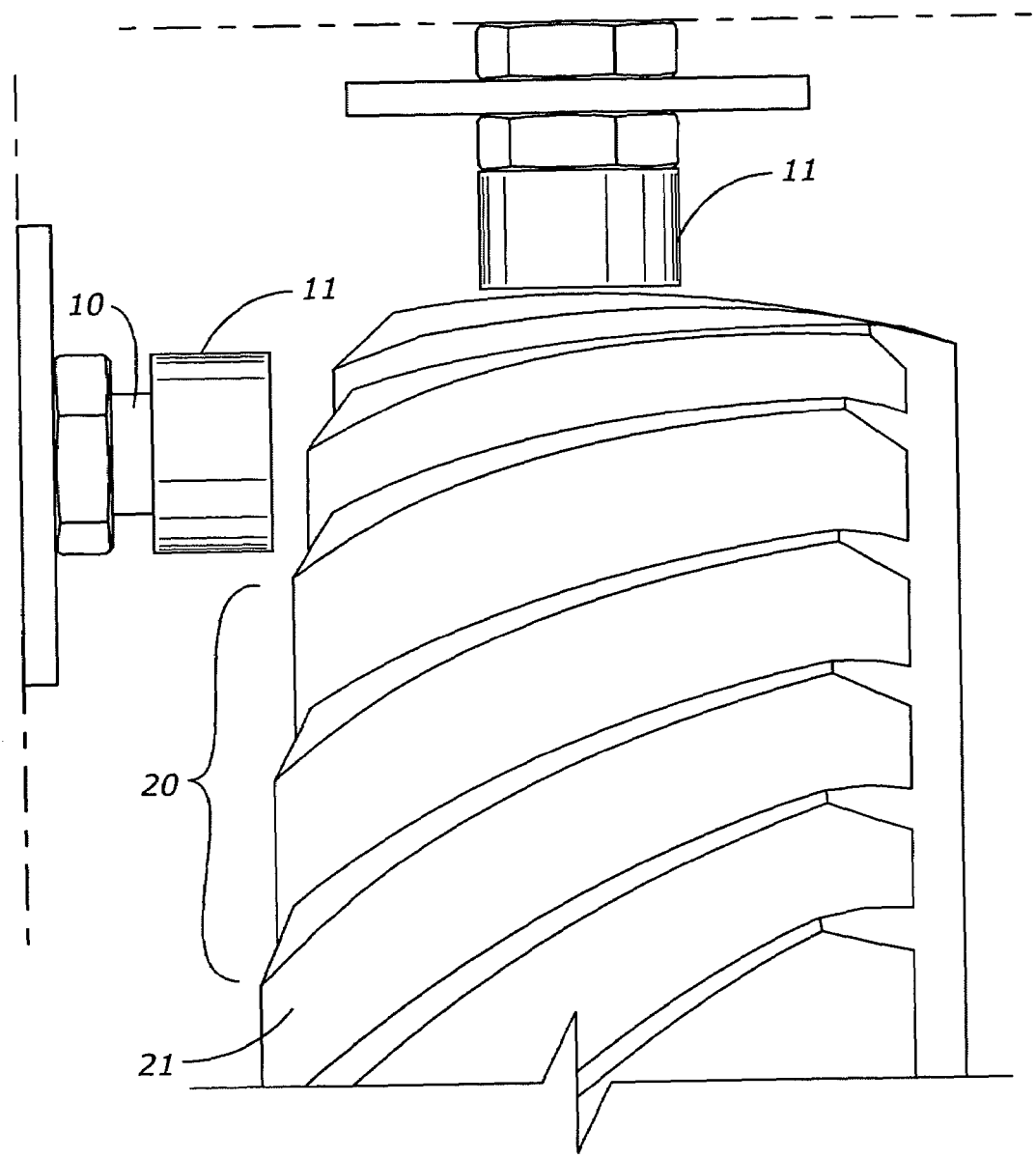
FIG. 10 is a perspective view of a gear with stainless steel-capped proximeters disposed radially and axially about gear teeth to simulate a nonintrusive proximeter arrangement, including a blind hole with a thin metal web between the proximeters and the gear teeth according to the present invention.

A typical proximeter is the Harco™ 350 F proximeter. The proximeters were tested in two separate configurations. The first is called an intrusive configuration, simulating a proximeter installation that would result from drilling a through hole in the gear case housing. In the intrusive configuration the proximeters were placed such that there was a 0.100 inch gap between the sensor tips and the gear teeth. The intrusive configuration is depicted in FIG. 1. The second configuration, depicted in FIG. 10, is called a non-intrusive configuration because a 0.07 inch-thick cap 11 was placed over the tips of the proximeters 10 to simulate a gear case housing blind hole discussed above and depicted in FIG. 3A. A gap of 0.030 inch was maintained between the cap 11 and the gear teeth 21. The proximeters were placed in four locations that were approximately evenly spaced about the circumference of the gear, i.e., at 12:00, 3:00, 6:00, and 9:00. In three of the locations both a radial and an axial measurement were obtained. Due to the limited number of sensors available, only the radial measurement was taken at the 9:00 location. Prior to installation in the test setup, the six foil-type strain gages were installed on the gear in the area around the tooth at the 12:00 position.

To determine the ability of the proximeters to track changes in gear structural responses, a method of simulating gear cracks was devised. As mentioned above, EDM-simulated cracks were formed in the gear after initially testing the gear in the unmodified condition. More particularly, the simulated cracks were induced by forming slots in separate gear teeth to verify detection of a worsening condition. The first slot was 0.50 inch long and 0.25 inch deep, and the second slot was 2.50 inch long and 0.430 inch deep. Both slots were 0.01 inch wide.

Prior to testing, dynamic analysis was preformed to determine the optimum locations for the sensors. The first 800 modes were evaluated by harmonic excitation. The gear rim structure, being very rigid, produced responses up to 80 kHz. Locations near the region of the proposed slot that produced high stresses and displacements under the tangential sinusoidal loading were identified for instrumentation. Hundreds of modes were evaluated but only a few full gear modes were excited from the tangential hammer loading. The resonance of some of the frequencies less than 35 kHz revealed that isolated modes are affected, and additional tests confirmed those measurements.

During testing, the gear was placed in vertical orientation on a rubber pad. Excitation was provided by an instrumented hammer mounted on a small electrodynamic shaker. Pulses from the modal system source were generated to provide a consistent impact loading from the hammer. The proximeters were mounted in a Unistrut® framework around the gear to maintain the proper alignment during testing. The gear was placed in the center of the framework and the proximeter positions were adjusted to obtain the desired gap with the sensor tip, which was measured with standard feeler gauges. After locking in the sensor positions, six accelerometers were installed directly on the gear. Testing was performed with the unmodified gear, and the procedure was then repeated with the gear having EDM-induced cracks in the gear teeth.

The hammer was positioned such that the point of impact was on the trailing edge side of the gear tooth either at 12:00 or 6:00, and data sets from both excitation locations were acquired. The hammer position was optimized to obtain the best possible impact and force range given the size of the hammer, the expected deformation of the gear teeth, and the angle of the applied impact. Impact levels varied during testing, with three separate data sets being acquired. Each data set was acquired over an average of thirty-two impacts from the hammer to smooth out the resulting response spectra of all sensors.

Due to a limitation of only six available channels in the data acquisition system, data was captured in groups generally consisting of the force transducer, two proximeters, one accelerometer, one strain gage, and the laser vibrometer. The force transducer and laser vibrometer measurements were included in every data set. For each data group, excitation was applied at 6 lb-peak (pk.), then 14 lb-pk., and then 20 lb-pk. hammer response. Each data group was acquired under the following conditions:

A. Hammer at 12:00, no caps on proximeters
    B. Hammer at 6:00, no caps on proximeters
    C. Hammer at 12:00, proximeters with caps
    D. Hammer at 6:00, proximeters with caps After acquiring data from the gear in the unmodified condition, the first slot was machined at the root of the 12:00 tooth, and between the 12:00 tooth and the next tooth in the counter-clockwise direction looking down on the gear hub. The slot did not go radially into the gear, but was angled so that the direction of the slot was normal to the fillet radius between the tooth and the valley. The gear was then re-installed in the test setup and the data set acquisitions repeated. The slot was then extended to the second dimension, the gear re-installed in the setup, and similar data sets acquired.

Following transfer of data acquisition into compiled analysis files (Universal 58 format), data was reviewed and analyzed with respect to the following objectives.

1. Verify the proximeter ability to detect the same frequencies as other sensors.
    2. Determine the measurement effects of varying levels of excitation.
    3. Determine the effects of input excitation location on sensitivity or response characteristics of proximeters placed at different circumferential locations.
    4. Determine the effects of the installation configuration (intrusive vs. non-intrusive, radial and axial orientation).
    5. Demonstrate the proximeter ability to detect changes in gear resonance behavior as a result of the physical modifications.

Data analysis revealed that the proximeters measured similar frequencies as the other sensors, although the accelerometers located directly on the gear teeth identified resonances that the proximeters and laser vibrometer did not detect. However, the resonance frequencies measured by the proximeters responded with the same characteristics as those of the other sensors. Increases in excitation force resulted in higher responses. The intrusive configuration of the proximeters resulted in higher sensitivity to the structural resonances, but the non-intrusive configuration, simulated by attachment of 0.07 inch-thick stainless steel caps, did not degrade the measurement to a level at which response characteristic responses were inadequate.

Figure 5:
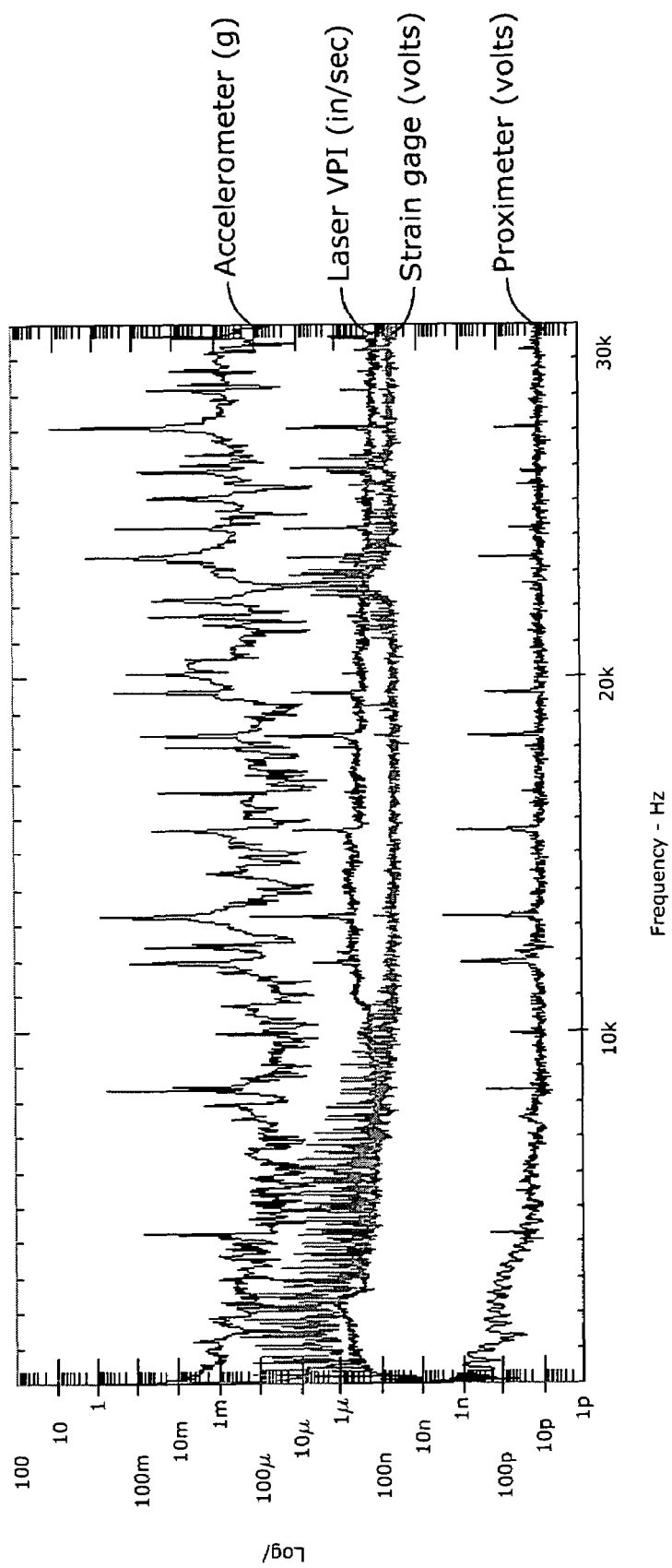
FIG. 5 is a graph that illustrates data from an overlay of measurements from several measurement systems for an unmodified gear.

FIG. 5 is a graph that illustrates an overlay of measurements from a specific measurement configuration for an unmodified gear, a 20 lb-pk excitation level at 12:00, and an intrusive proximeter configuration. The data in FIG. 5 demonstrates the commonality in frequency content between the proximeter, strain gauge, laser VPI, and accelerometer. The data also reveals that strain level responses at the strain gage locations were not significant enough to provide reliable data.

When reviewing the data in FIG. 5, it is important to note that the accelerometers (as mounted directly to gear teeth) and laser velocimeter measured some resonant frequencies that did not appear at the proximeter sensors. However, for the purposes of this test series, it was determined that the number of common frequencies found between the proximeters and other sensors was more than sufficient to demonstrate the usefulness of the present invention. Further, as noted above, the accelerometers were installed directly on the gear tooth features, and it is not typical for accelerometers to be directly attached to working surfaces when monitoring a rotating system.

Next, the effect of varying input force excitation levels on the instrumentation was tested. The overwhelming trend, as predicted, was an increase in response in each of the instrumentation types and locations as input force was increased. In a few cases, some resonant frequencies did not demonstrate a linear increase in response level with respect to the input force, but nonetheless the changes could easily be observed in the data. It should be noted that the proximeters closest to the excitation location showed a significantly higher noise level below 10 kHz. However, frequencies above 10 kHz did not show any degradation in signal-to-noise ratio regardless of excitation level or location.

Continuing to review data characteristics, the effect of excitation location was next evaluated. Data pertaining to the excitation hammer impacting the trailing edge of the teeth at 12:00 and at 6:00 were compared. Data from the test revealed that lower frequency noise is higher in level at proximeters nearest the excitation location due to the disturbance in the proximeter electromagnetic field resulting from the hammer moving through the field. The farther away from the excitation, the lower the low frequency (<10 kHz) noise becomes. However, at frequencies above 10 kHz, the excitation location did not affect the signal-to-noise ratio of the proximeter measurements. In addition, both the radial and axial measuring proximeters demonstrated similar response characteristics.

Figure 6:
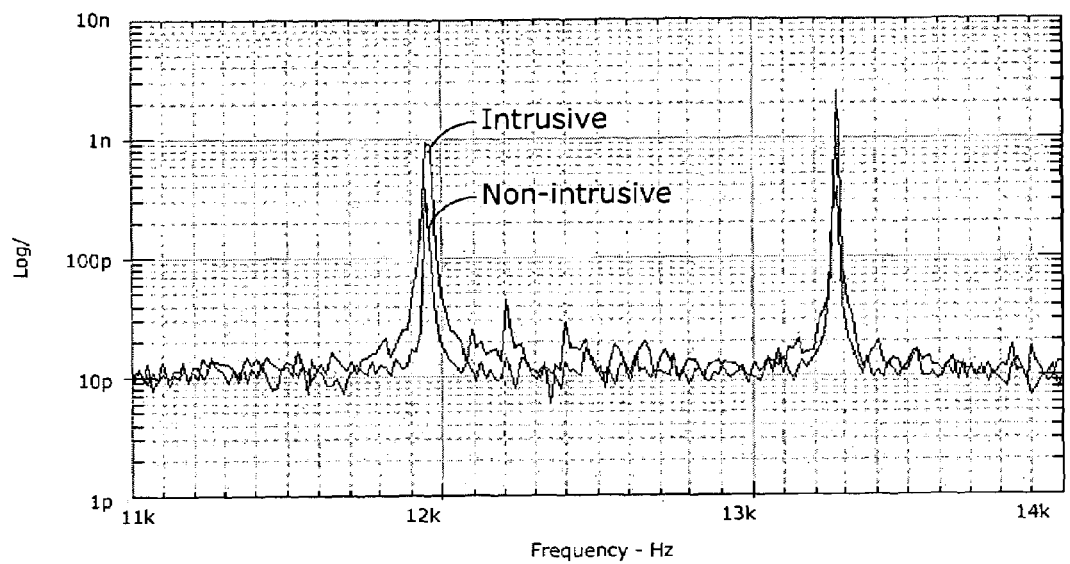
FIG. 6 is a graph that illustrates data from an overlay of intrusive and nonintrusive radially oriented proximeter measurements for an unmodified gear according to the present invention.
Figure 7:
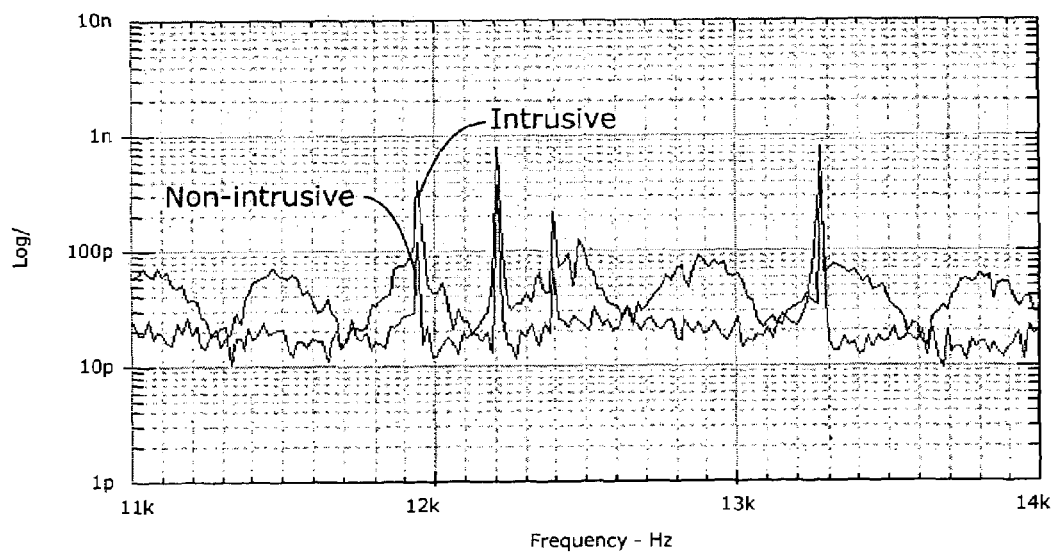
FIG. 7 is a graph that illustrates data from an overlay of intrusive and nonintrusive axially oriented proximeter measurements for an unmodified gear according to the present invention.

Next, data from different proximeter configurations were measured. The proximeter data for the intrusive conditions and non-intrusive conditions were compared at various excitation levels and locations. FIGS. 6 and 7 are graphs that illustrate the effect of the two configuration differences. FIG. 6 is a graph that illustrates an overlay of intrusive and nonintrusive proximeter measurements for an unmodified gear, a 20 lb-pk excitation level, with the proximeters being radially oriented at the 12:00 position. FIG. 7 is a graph that illustrates an overlay of intrusive and nonintrusive proximeter measurements for an unmodified gear, a 20 lb-pk excitation level, with the proximeters being axially oriented at the 12:00 position.

In general, the proximeters showed a reduction in sensitivity with the addition of the caps. However, even with the reduction in sensitivity, all major structural resonances still appeared in the proximeter measurements at levels that made the frequencies readily identifiable. In addition to the data shown in FIGS. 6 and 7, measurements collected from proximeters at the 6:00 position produced similar results that verified the ability for the nonintrusive proximeter to collect identifiable resonance data.

Figure 8:
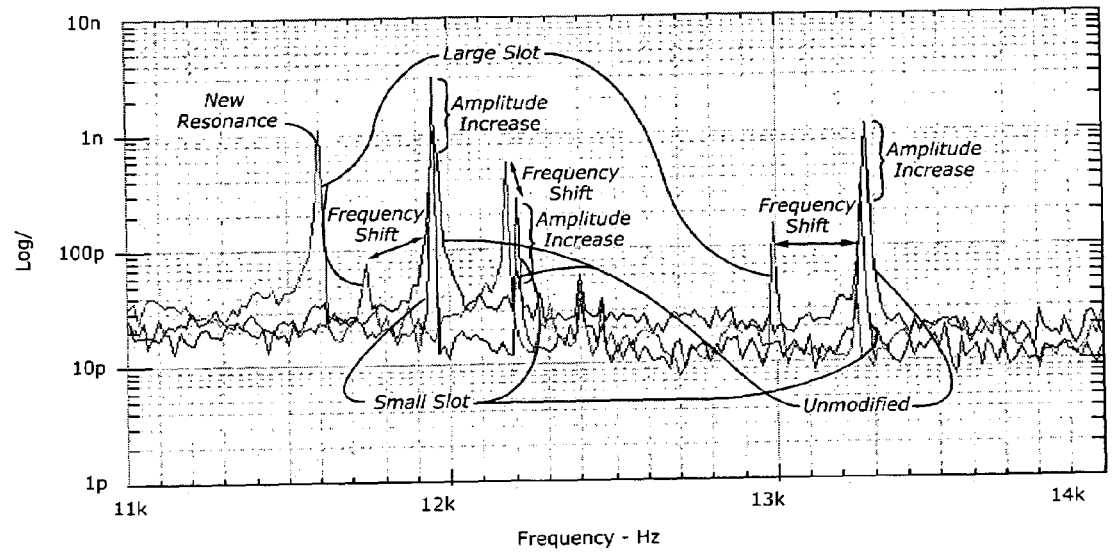
FIGS. 8 and 9 are graphs that together illustrate data from measurements ranging between 11 and 20 kHz for structural resonance changes in gears that are unmodifed, modified with a small simulated flaw, and modified with a large simulated flaw.
Figure 9:
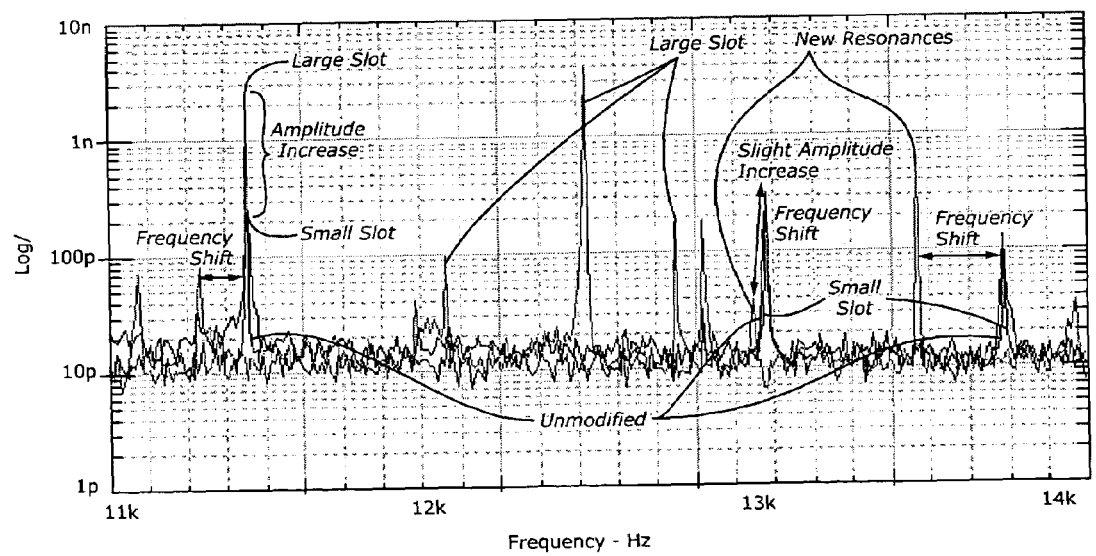

Finally, the ability of the proximeters to detect changes in resonant frequencies for gears with progressively larger mechanical faults was observed. The faults that were EDM-induced into the gear teeth were modeled from previous vibration diagnostic (seeded) testing, conducted on transmission gears of the same part number. FIGS. 8 and 9 are graphs that are exemplary of the many tests performed, and illustrate the structural resonance changes as a result of the simulated flaw size for an gear, a 20 lb-pk excitation level, with the proximeters being radially oriented at the 12:00 position. By comparing measurements taken from the unmodified condition to measurements taken from the gear with the small and large slots, changes in frequency could easily be seen in the data. All the instruments that were used for measurements demonstrated similar shifts in frequency. The small slot only caused a slight change in the measured frequencies by approximately one bandwidth (16 Hz), but the amplitude of the resonances increased significantly as a result of this modification. The large slot not only shifted the resonant frequencies of the structure, but also induced new resonances not previously noted. The proximeters demonstrated the capability to measure changes in the resonant frequencies for both loaded and unloaded flawed gear teeth, and the measurements were consistently correlated with the flaw size. The measurements reveal the ability to provide non-intrusive means for gear health monitoring, and life prediction in real time using proximeters according to the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for monitoring rotating machinery having a shaft and circumferentially disposed extensions rotatable with said shaft and spaced apart from one another, the system comprising:
   a plurality of proximeters positioned proximate to said rotating machinery and each proximeter being operable to measure and transmit resonant vibration frequency and bending amplitude data for said rotating machinery derived from a transit time between said individual rotating extensions, along with distance data derived from signal amplitude data for a proximeter signal strength of the bending, wherein said plurality of proximeters are positioned so as to enable mapping a resonance period of said rotating machinery; and a processor electrically coupled to receive said data and configured to correlate said data and thereby produce an assessment of operational health for said machinery.

2. A system according to claim 1, wherein said processor assessment includes a remaining operational life prediction for said machinery.

3. A system according to claim 1, wherein said processor assessment includes a maintenance schedule for said machinery.

4. A system according to claim 1, wherein said distance data includes radial runout data for said shaft.

5. A system according to claim 4, wherein said rotating machinery comprises a gearbox comprising a gear having multiple teeth, and said radial runout data indicates radial positions of said teeth.

6. A system according to claim 1, wherein said rotating machinery includes a rotating shaft, and said processor correlates said resonant vibration data and radial runout data for said shaft.

7. A system according to claim 6, wherein said proximeters further measure and transmit axial movement data for said shaft.

8. A system according to claim 7, wherein said rotating machinery comprises a gearbox comprising a gear having multiple teeth, and said proximeters further measure and transmit axial movement data.

9. A system according to claim 1, wherein said processor correlates said resonant vibration data and axial movement data for said shaft.

10. A system according to claim 1, wherein said proximeters are electromagnetic proximeters.

11. A system according to claim 1, wherein said proximeters are capacitive proximeters.

12. A system according to claim 1, wherein said proximeters are optical proximeters.

13. A system according to claim 1, further comprising:
multiple rotating machinery components having a shaft and circumferentially disposed extensions rotatable with said shaft and spaced apart from one another; and
additional proximeters, positioned circumferentially apart from one another and proximate to different respective components, and operable to measure and transmit nonduplicative resonant vibration and bending amplitude data for each of said rotating extensions along with distance data derived from signal strength of the bending amplitude data for said multiple rotating machinery components.

14. A system according to claim 1, wherein said rotating machinery comprises a gearbox comprising a gear having multiple teeth.

15. A system according to claim 1, wherein a first and a second of said plurality of proximeters are orientated at about 90° to each other.

16. A system according to claim 15, wherein said gearbox comprises at least two gears that mesh at a meshing point, and at least one of said proximeters is disposed at a location approximately 180° from said meshing point.

17. A system according to claim 1, further comprising:
a housing having an interior space in which said rotating machinery is disposed, and a wall defining at least a portion of said interior space and separating said proximeters from said rotating machinery.

18. A system according to claim 17, wherein at least one of said proximeters is an electromagnetic proximeter, and said wall has a blind hole extending partially through said wall in which one of said electromagnetic proximeter is disposed.

19. A system according to claim 1, wherein at least one of said proximeters is exposed to said rotating machinery.

20. A system according to claim 1, wherein said processor compares said measurements with predetermined values to assess said rotating machinery operational health.

21. A system according to claim 20, wherein said predetermined values include previously accumulated resonance data, including established maximum values for acceptable machinery fatigue levels.

22. A system according to claim 21, wherein said resonance data comprises vibration frequency data.

23. A system according to claim 21, wherein said resonance data comprises circumferential vibration amplitude data.

24. A system according to claim 21, wherein said predetermined values further comprise values for a radial gap between a gear tooth and a housing in which said gear tooth is housed.

25. A system according to claim 1, further comprising:
an alerting signal generator that produces a signal reporting said rotating machinery operational health.

26. A system according to claim 25, wherein said alerting signal comprises instructions for maintaining said rotating machinery.

27. A system according to claim 25, wherein said alerting signal comprises a textual, audio, or video signal.

28. A system according to claim 25, wherein said alerting signal automatically halts action of said rotating machinery.

29. A system according to claim 1, wherein said processor is configured to detect rotating machinery chatter.

30. A system according to claim 29, wherein said processor is configured to detect a frequency and amplitude of said machinery chatter.

31. A system according to claim 30, wherein said processor is configured to assess lubricity degradation for said rotating machinery based on said machinery chatter.

32. A system according to claim 1, wherein said rotating machinery comprises a gearbox comprising a gear having multiple teeth, and said proximeters are spaced at odd harmonics of the resonance frequency quarter wavelength of said teeth.

33. A method for monitoring rotating machinery having a shaft and circumferentially disposed extensions rotatable with said shaft and spaced apart from one another, the method comprising the steps of:
positioning a plurality of proximeters proximate to said rotating machinery, each of said proximeters being operable to measure and transmit resonant vibration and bending amplitude data for said rotating machinery derived from a transit time between said individual rotating extensions, along with distance data derived from signal strength of the bending amplitude data for a proximeter signal;
receiving and correlating said data using a processor that is electrically coupled to said plurality of proximeters to map a resonance period of said rotating machinery;
producing an assessment of operational health for said machinery based on said measurements using said processor; and
outputting the assessment of operational heath.

34. A method according to claim 33, wherein said assessment includes a remaining operational life prediction for said machinery.

35. A method according to claim 33, wherein said processor assessment includes a maintenance schedule for said machinery.

36. A method according to claim 33, wherein said rotating machinery includes a rotating shaft, and said distance data includes radial runout data for said shaft.

37. A method according to claim 36, wherein said rotating machinery comprises a gearbox comprising a gear having multiple teeth, and said radial runout data indicates radial positions of said teeth.

38. A method according to claim 33, wherein said processor correlates said distance data and thereby produces radial runout data for said shaft.

39. A method according to claim 33, wherein said rotating machinery includes a rotating shaft, and said resonant vibration data includes axial movement data for said shaft.

40. A method according to claim 39, wherein said rotating machinery comprises a gearbox comprising a gear having multiple teeth, and said axial movement data indicates radial positions of said teeth.

41. A method according to claim 33, wherein said processor correlates said resonant vibration data and thereby produces axial movement data for said shaft.

42. A method according to claim 33, wherein said proximeters are electromagnetic proximeters.

43. A method according to claim 33, wherein said proximeters are capacitive proximeters.

44. A method according to claim 33, wherein said proximeters are optical proximeters.

45. A method according to claim 33, wherein said proximeters are fiber optical proximeters.

46. A method according to claim 33, wherein said positioning step further comprises circumferentially positioning additional proximeters apart from one another and proximate to different respective rotating machinery components having a shaft and circumferentially disposed extensions rotatable with said shaft and spaced apart from one another, said additional proximeters being operable to measure and transmit nonduplicative resonant vibration frequency and bending amplitude data for each of said rotating extensions of said multiple components.

47. A method according to claim 33, wherein said rotating machinery is a gearbox comprising a gear having multiple teeth.

48. A method according to claim 47, wherein said assessing step comprises assessing operational health of each of said teeth.

49. A method according to claim 47, wherein said gearbox comprises at least two gears that mesh at a meshing point, and said positioning step comprises positioning at least one of said proximeters at a location approximately 180 degree from said meshing point.

50. A method according to claim 33, wherein said positioning step comprises attaching said proximeter to a housing having an interior space in which said rotating machinery is disposed, and a wall defining at least a portion of said interior space and separating said proximeter from said rotating machinery.

51. A method according to claim 50, wherein at least one of said proximeters is an electromagnetic proximeter, and said positioning step comprises positioning said proximeter in a blind hole that is formed in and extends partially through said wall.

52. A method according to claim 33, wherein said positioning step comprises exposing at least one of said proximeters to said rotating machinery.

53. A method according to claim 33, wherein said assessing step comprises comparing said measurements with predetermined values to assess said rotating machinery operational health.

54. A method according to claim 53, wherein said predetermined values include previously accumulated resonance data, including established maximum values for acceptable machinery fatigue levels.

55. A method according to claim 54, wherein said resonance data comprises vibration frequency data.

56. A method according to claim 54, wherein said resonance data comprises circumferential vibration amplitude data.

57. A method according to claim 54, wherein said predetermined values further comprise values for a radial gap between a gear tooth and a housing in which said gear tooth is housed.

58. A method according to claim 33, further comprising the step of: generating an alerting signal that reports said rotating machinery operational health.

59. A method according to claim 58, wherein said alerting signal comprises instructions for maintaining said rotating machinery.

60. A method according to claim 58, wherein said alerting signal comprises a textual, audio, or video signal.

61. A method according to claim 58, wherein said alerting signal automatically halts action of said rotating machinery when said rotating machinery operational health is poor.

62. A method according to claim 33, further comprising detecting chatter from said rotating machinery using said processor.

63. A method according to claim 62, further comprising determining a frequency and amplitude of said machinery chatter using said processor.

64. A method according to claim 63, wherein said processor assessment comprises a lubricity degradation assessment for said rotating machinery based on said machinery chatter data.

65. A method according to claim 33, wherein said rotating machinery comprises a gearbox comprising a gear having multiple teeth, and said proximeters are spaced at odd harmonics of the resonance frequency quarter wavelength of said teeth.

66. A system for monitoring rotating machinery having a shaft and circumferentially disposed extensions rotatable with said shaft and spaced apart from one another, the system comprising:
   a plurality of proximeters positioned proximate to said rotating machinery and each proximeter being operable to measure and transmit resonant vibration frequency and bending amplitude data derived from a transit time between said individual rotating extensions, along with distance data derived from signal strength of the bending amplitude data, wherein said proximeters are selected from the group consisting of electromagnetic proximeters, and capacitive proximeters; and
   a processor electrically coupled to receive said data and configured to correlate said data and thereby produce an assessment of operational health for said machinery.

* * * * *